C. L. Pierce,
Sawing Shingles,
No. 42,505. Patented Apr. 26, 1864.
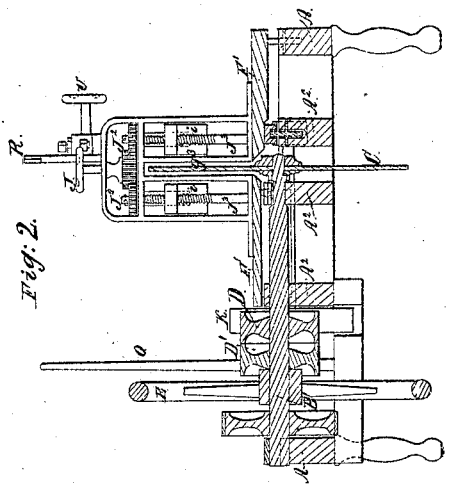
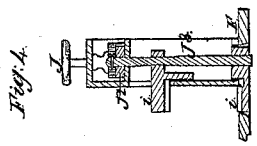
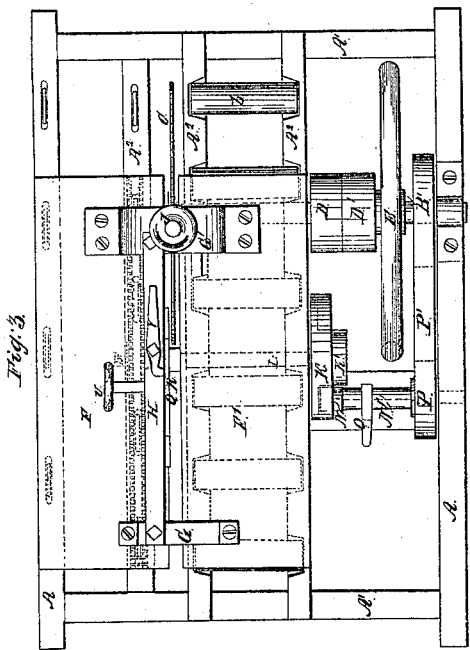
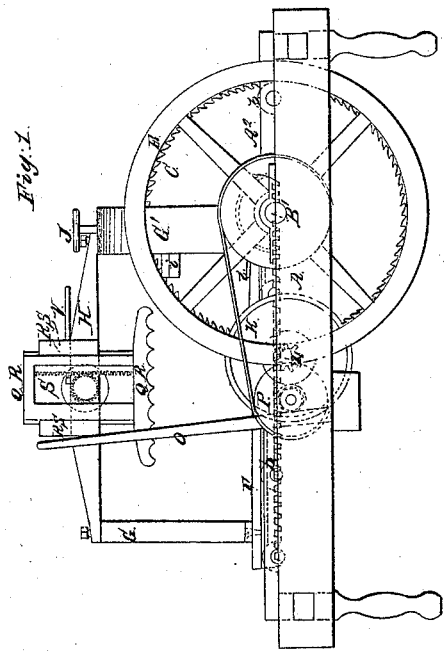
Witnesses:
M. P. Fillmore
E. B. Forbush
Inventor:
Chas. L. Pierce

UNITED STATES PATENT OFFICE.

CHARLES L. PIERCE, OF BUFFALO, NEW YORK.

IMPROVEMENT IN SAWING-MACHINES.

Specification forming part of Letters Patent No. 42,505, dated April 26, 1864.

*To all whom it may concern:*

Be it known that I, CHARLES L. PIERCE, of the city of Buffalo, and State of New York, have invented a new and Improved Machine for Sawing Shingle-Bolts; and I do hereby declare that the following is a full, clear, and exact description of the construction and operation thereof, reference being had to the accompanying drawings, making a part of this specification, in which—

Figure I is a side elevation. Fig. II is a vertical transverse section on line 1 2 of Fig. III. Fig. III is a plan. Fig. IV is a section of the standard G', showing the arrangement and form of the dogs $i\ i$.

Letters of like name and kind refer to like parts in each of the figures.

The main frame-work of the machine consists of the side rails, A, framed together by the girts A' and timbers A², which lie parallel with the side rails, to afford bearings for the friction-rollers $b$, upon which the bolt-table moves, and also for the saw-arbor and other operating parts.

C represents a circular saw mounted upon the end of the arbor B', which has its bearings in journal-boxes, supported upon the parallel timbers A A².

D is a driving-pulley and D' a loose pulley upon the arbor B', combined with a shifter and operating in a common manner.

E is a fly-wheel, also on the arbor-shaft, which makes the motion of the saw uniform.

The table which conveys the block or bolt to the saw consists of two planks, F F', one upon each side of the saw. These are connected together by the arched standards G G', which standards are also connected by the cross piece H. The arch or slit $g^3$ in the standards allows the saw to pass through as the table moves, so as to cut entirely through the shingle block.

The forward standard, G', has four dogs, $i\ i\ i\ i$, beveled to an edge toward the saw, so that when they are set into the block they will have a tendency to press the two parts of the block outwardly as the saw enters and prevent the block from pinching the saw as it passes through. Two of these dogs are upon each side of the slit in the standard, and they are all operated together by means of the wheel J and pinion J', which pinion meshes with the two side pinions, J², which are connected with the screw-shafts J³, so that the dogs may be all drawn toward the block and take a fast hold thereof by turning the wheel J.

There is a compound friction-wheel, composed of the outer rim, K, and inner rim, K', and supported upon the shaft L. There is a small pinion, L', on the end of this shaft, which meshes in with a rack, M, which rack is on the under side of the table F. There is also a small friction-wheel, N, upon the end of the shaft N', which friction-wheel lies between the rims K and K'. This friction-wheel may be caused to bear against either the rim K or K', and thereby run the block-table F F' in either direction, as desired, to feed the block to the saw or to carry the table back after the saw has passed through.

P is a driving-pulley on the shaft N, and P' a belt from thence to a pulley on the shaft B'.

Q R is a dog, which is moved up and down with the guides R S by means of the rack-teeth S and pinion T, and wheel W. This dog is made long, so that it will reach onto several quarter-blocks at the same time and hold them down while the saw passes through. The guide R S is made fast to the cross-piece H.

V is a dog which catches into the rack-teeth, and will hold the dog Q R whenever placed.

The block to be sawed into bolts is placed upon the table F F' and properly secured and held down by means of the dogs, as before described, and, the saw being put in motion, the table carrying the block may be run up to the saw so that the saw will pass through the block. The table may be run back and forth, as desired, to saw the blocks into the required bolts. This machine has been practically tested and its utility fully demonstrated.

What I claim as my invention, and desire to secure by Letters Patent, is—

1. The compound friction-wheel K K', shaft L, and pinion L', in combination with the friction-wheel N, shaft N', pulley P, and shifting-lever O, for the purposes substantially as described.

2. The planks F F', connected together by the arched standards G G', which planks and standards form a movable table for carrying the shingle block to the saw, substantially as described.

3. The dog Q R, supported and operated upon the cross-piece H, for the purposes and substantially as set forth.

CHAS. L. PIERCE.

Witnesses:
M. P. FILLMORE,
E. B. FORBUSH.